(12) United States Patent
Chiu et al.

(10) Patent No.: US 8,055,714 B2
(45) Date of Patent: Nov. 8, 2011

(54) METHOD FOR CIRCULATING A REPORT IN A SEMICONDUCTOR MANUFACTURING ENVIRONMENT

(75) Inventors: Chien-Yuan Chiu, Baoshan Shiang Hsinchu County (TW); Mabel Wan, Hsinchu (TW); Chuang Ming Tai, Jhubei (TW); Jennifer Leu, Freemont, CA (US)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 2343 days.

(21) Appl. No.: 10/821,016

(22) Filed: Apr. 8, 2004

(65) Prior Publication Data
US 2005/0256928 A1   Nov. 17, 2005

(51) Int. Cl.
*G06F 15/16* (2006.01)
(52) U.S. Cl. ........................... 709/206; 709/246
(58) Field of Classification Search .................. 709/206, 709/246, 217
See application file for complete search history.

(56) References Cited

U.S. PATENT DOCUMENTS

| 5,220,500 | A | 6/1993 | Baird et al. |
| 6,363,414 | B1 * | 3/2002 | Nicholls et al. ............... 709/206 |
| 6,424,426 | B1 | 7/2002 | Henry |

OTHER PUBLICATIONS

Lu et al., B2B in TSMC Turnkey Services, Oct. 8, 2001, Semiconductor Manufacturing Symposium, 2001 IEEE International, pp. 41-44.*
Hsieh, Dennys Sung-Ting, et al., "TSMC Turnkey Data Mart", SMTW 2002 Symposium, http://dennys.tiger2.net/me/publication/2002.12.10_smtw/index.html, printed on Jan. 9, 2004, 5 pages.
Hseih, Dennys Sung-Ting, et al., "B2B in TSMC Turnkey Service", ISSM 2001 Symposium, http://dennys.tiger2.net/me/publication/2001.10.08_issm/index.html, printed on Jan. 9, 2004, 5 pages.

* cited by examiner

*Primary Examiner* — Peling Shaw
(74) *Attorney, Agent, or Firm* — Haynes and Boone, LLP (57) ABSTRACT

A system, method, and computer-implemented method for circulating a file associated with the manufacture of a semiconductor product. The computer-implemented method may include choosing at least one input file, choosing an output file format, choosing a mode for circulation, extracting file information to the output file, and circulating the output file to at least one recipient.

26 Claims, 6 Drawing Sheets

METHOD FOR CIRCULATING A REPORT IN A SEMICONDUCTOR MANUFACTURING ENVIRONMENT

BACKGROUND

The present disclosure relates generally to the field of semiconductor manufacturing and, more particularly, to a system and method to report business capital data.

The semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing have been needed. For example, an IC is formed by creating one or more devices (e.g., circuit components) on a substrate using a fabrication process. As the geometry of such devices is reduced to the submicron or deep submicron level, the IC's active device density (i.e., the number of devices per IC area) and functional density (i.e., the number of interconnected devices per IC area) has become limited by the fabrication process. Certain processes, such as a copper damascene process, may be selected to achieve the desired device density.

Furthermore, as the IC industry has matured, the various operations needed to produce an IC may be performed at different locations by a single company or by different companies that specialize in a particular area. This further increases the complexity of producing ICs, as companies and their customers may be separated not only geographically, but also by time zones, making effective communication more difficult. For example, a first company (e.g., an IC design house) may design a new IC, a second company (e.g., an IC foundry) may provide the processing facilities used to fabricate the design, and a third company may assemble and test the fabricated IC. A fourth company may handle the overall manufacturing of the IC, including coordination of the design, processing, assembly, and testing operations.

In managing the business of IC manufacturing, many kinds of files needs to be distributed among users. These may be business report files, may be of different file types, in different file formats, and associated with different application software. For example, some files may not be easily extracted to form an email attachment. All users, including outside users such as customers and shareholders, and inside users such as the management and marketing teams, may require report files through different media, such as emails, faxes, and/or wireless devices. There is not currently available an integrated system and method to circulate files on a variety of media. It is expected that such a system could reduce the cost on management effort and processing time, improve processing efficiency, security, report or analysis thoroughness, and/or provide enhanced report distribution.

Accordingly, what is needed is a system and method to implement an integrated file server to automatically process a variety of files, combine information, and/or transfer the files to recipients through different media and formats according to applications and needs.

DETAILED DESCRIPTION

The present disclosure relates generally to the field of semiconductor manufacturing and, more particularly, to a system and method to implement an integrated file server to automatically process a variety of files, combine information, and transfer the files to recipients through different media and formats according to applications and needs.

It is understood, however, that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A business capital data report involves a lot of information from different file sources and business data models. One example is an SAP business warehouse (BW). BW is a packaged, comprehensive business intelligence product centered around a data warehouse that is optimized for, but not limited to, the R/3 environment from SAP as disclosed in the text IMPLEMENTING SAP R/3, 2ND EDITION, by Nancy Bancroft, 1997, which is herein incorporated by reference. Like most data warehouses, BW is a combination of databases and database management tools that are used to support management decision making. SAP applications, built around the R/3 system, provide the capability to manage financial, asset, and cost accounting, production operations and materials, personnel, plants, and archived documents. The R/3 system runs on a number of platforms including "Windows 2000" (® of Microsoft Corp., Redmond, Wash.) and uses the client/server model.

Report files may need to be customized to fit each situation, such as what information should be included, to whom the file is addressed, and where and/or how to send the file (email, fax, and wireless device). With an integrated file server incorporated into an email system, all related information could be easily extracted, converted, combined, and sent out through an email system to different types of receiving devices.

Figure 1:
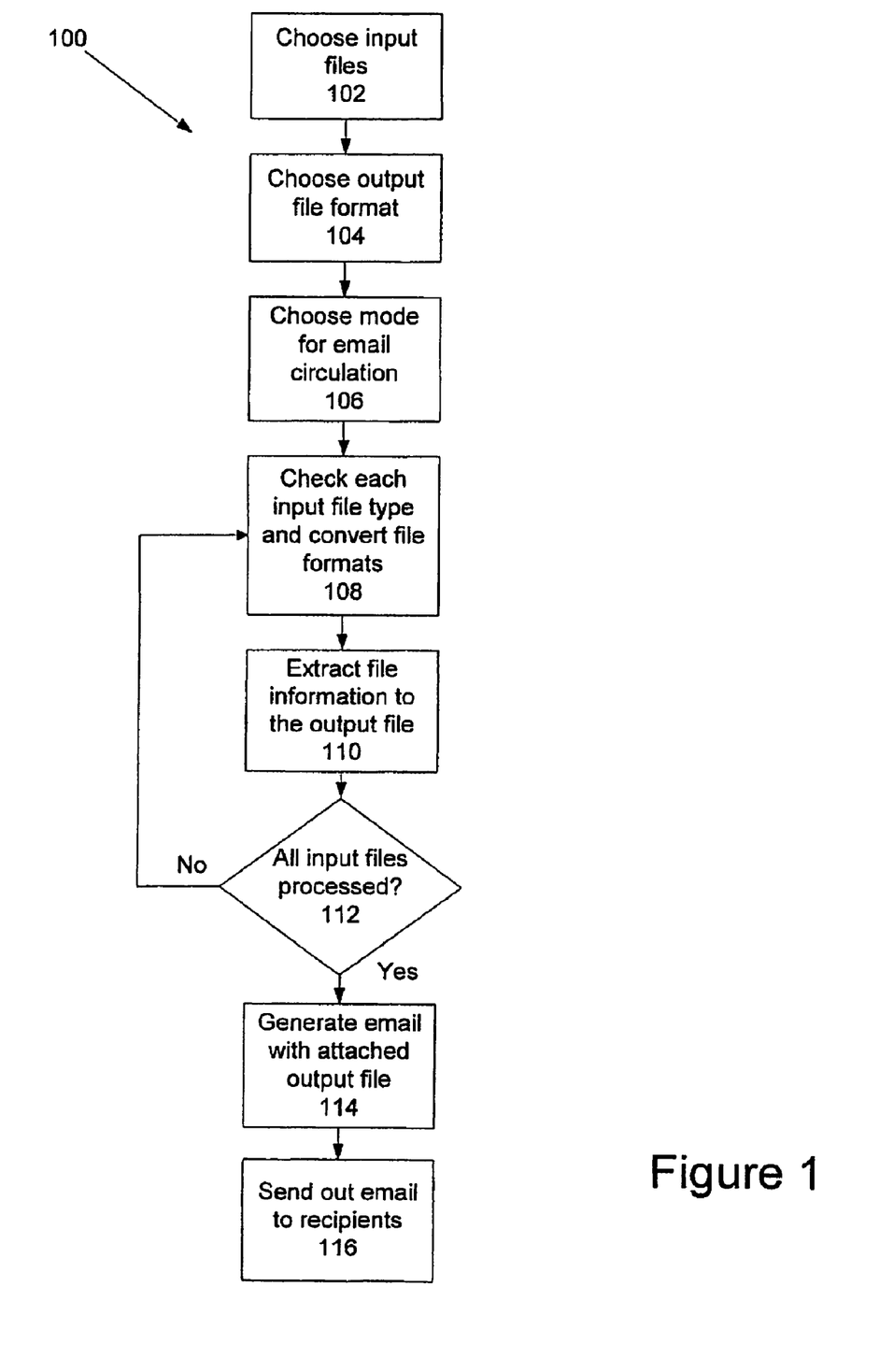
FIG. 1 is a flowchart of a method of one embodiment of the present disclosure.

Referring to FIG. 1, in one embodiment, method 100 to integrate business report files is illustrated. Method 100 begins at 102, where users are asked to choose input files to extract information from for a business report. The users can directly access, and then load the files. Or users could search for particular files or types of files, for example by typing in key words for the integrated file system to search, and listing these files, and then the users could select files from the list.

At 104, users are asked to choose an output file format for the business report. An integrated file server, may have several different structured file formats available for different needs, or may have several pre-structured building blocks for users to choose from, so the integrated file server can extract information from selected input files according to each building block, and then these building blocks can be combined into an output file for a business report.

At 106, users are asked to choose a mode for circulation or, alternatively, types of devices to receive files, such as computers, fax machines, or wireless devices. The integrated file server will convert input files into final files according to the types of receiving devices.

At 108, the integrated file server will automatically check the file type of each input file, and may convert the file format, if necessary. At 110, information will be extracted from each input file and transferred into an output file according to preset rules.

At 112, the integrated file server will check if all selected input files have been processed. If not, the integrated file server will return back to 108 to repeat the same processing procedure for the next input file in the queue. Otherwise, the system will move to 114.

At 114, the system will automatically generate an email with output file attached in a pre-chosen mode. The output file could be in a corresponding format for an email reader, fax machine, and/or wireless device, according to the choice(s) made at 106. This file could be either automatically saved to an email outbox, placed in a queue on a fax machine, and/or prepared for transfer to a wireless device. In one embodiment, this method could save a sender or receiver time and effort from converting files, combining files, and attaching files.

At 116, as long as the recipients list is filled in, the email is ready to send out to recipients through a network system, to which a telephone system such as a private branch exchange (PBX) system may be connected. The recipients may be asked for authority verification such as typing a password or speaking a password before accessing the message and file, depending on confidentiality and security concerns.

Figure 2:
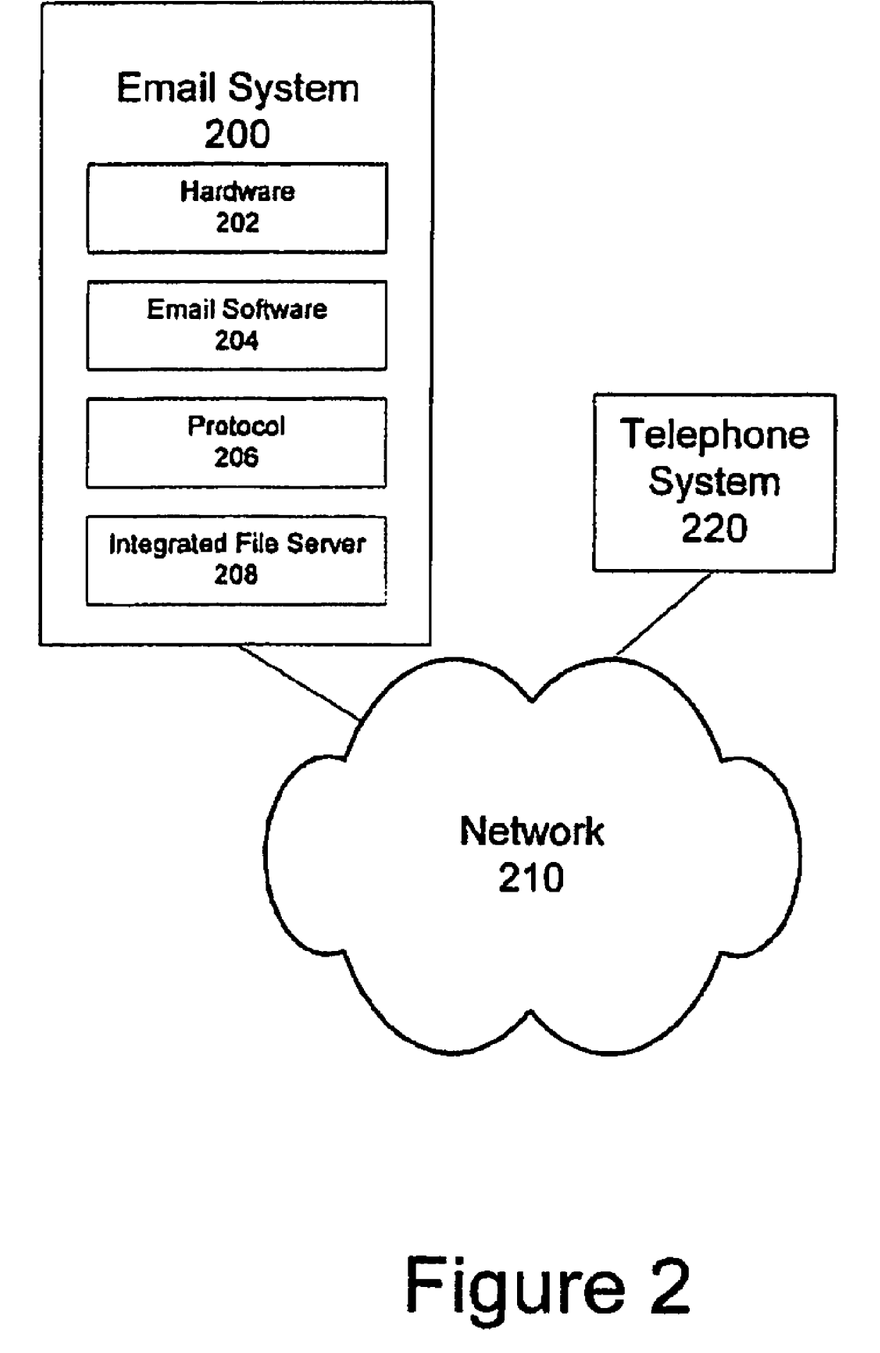
FIG. 2 is a block diagram of an integrated email system.

Referring now to FIG. 2, the method 100 of FIG. 1 may be performed in a networked environment as illustrated. The networked environment includes an email system 200, which further includes hardware 202, software 204, protocol 206, and integrated file server 208. Although illustrated as a single unit, the email system 200 may be a distributed system having many different components. Hardware 202 could be a computer, a PDA, a wired or cellular phone, a pager, or a combination of the above. Software 204 could be any appropriate email program, such as Eudora, Netscape Messenger, Microsoft Outlook, or Lotus Notes Client. Protocol 206 used in email system 200 may include Hyper Text Transfer Protocol (HTTP, world wide web protocol), Post Office Protocol version 3 (POP3, Internet email protocol), Internet Message Access Protocol (IMAP), or Simple Mail Transfer Protocol (SMTP, internet email). The integrated file server 208 may reside in a computer, and could function to detect the file type of application files, convert files to a proper type or format according to needs, combine input files to an integrated file for business reports, automatically attach target files to an email for distribution, and send out files to recipients for different receiving devices such as email, fax, or wireless devices. The email system 200 is connected to network 210, which may be a complete network or a subnet of a local area network, a company wide intranet, and/or the Internet. A telephone system 220, such as a PBX is shown connected to network 210 for voice message or fax message circulation.

Figure 3:
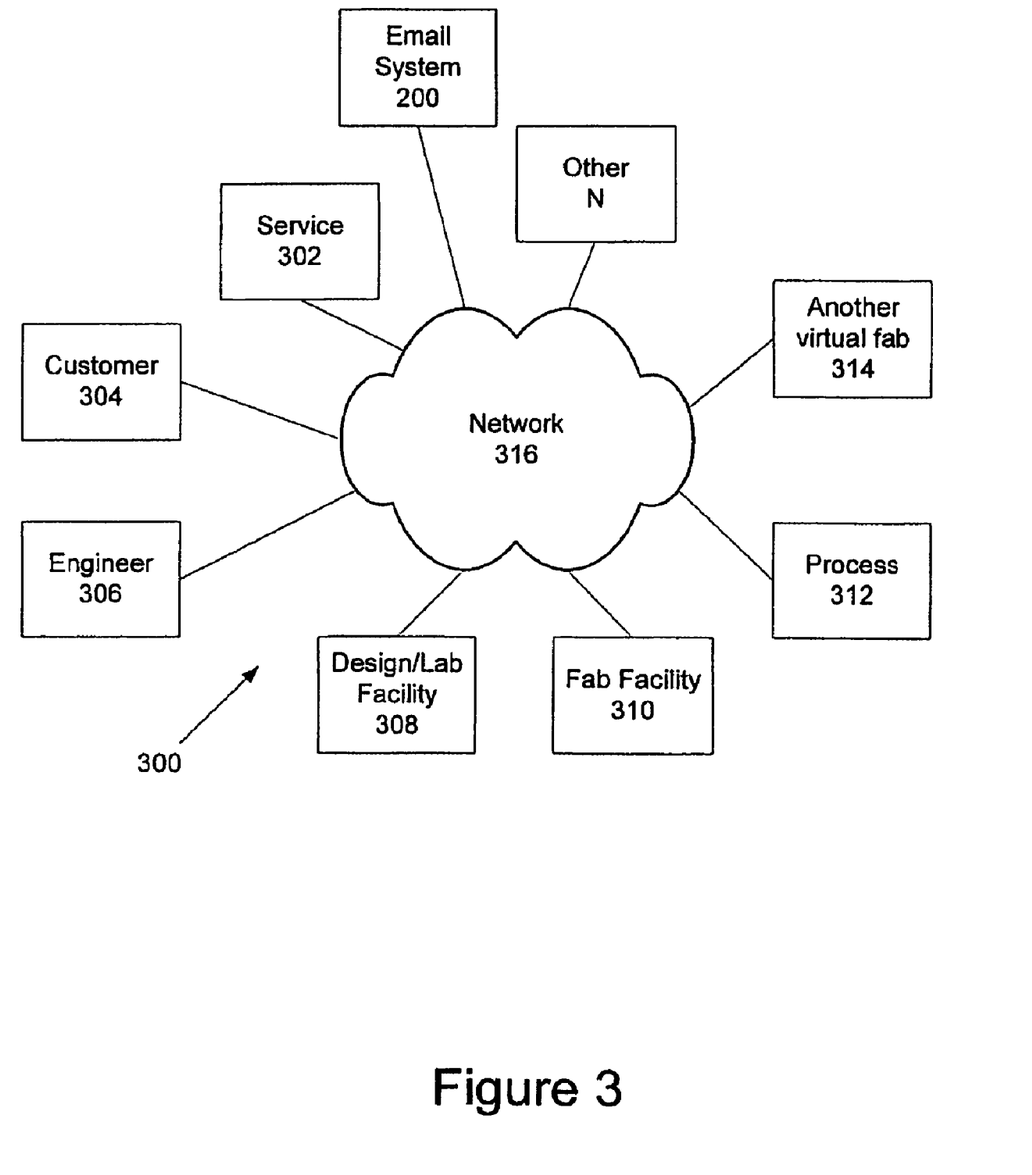
FIG. 3 is a block diagram of an embodiment of a virtual fabrication system.

Referring now to FIG. 3, for the sake of further example, a virtual IC fabrication system (a "virtual fab") 300 is illustrated, to which email system 200 of FIG. 2 is attached. Virtual fab 300 includes a plurality of entities 302, 304, 306, 308, 310, 312, 314, ..., N that are connected by communications network 316. Network 316 may be a single network or may be a variety of different networks, such as an intranet and the Internet, and may include both wireline and wireless communication channels.

In this embodiment, entity 302 represents a service system for service collaboration and provision, entity 304 represents a customer, entity 306 represents an engineer, entity 308 represents a design/laboratory (lab) facility for IC design and testing, entity 310 represents a fabrication (fab) facility, entity 312 represents a process (e.g., an automated fabrication process), and entity 314 represents another virtual fab (e.g., a virtual fab belonging to a subsidiary or a business partner). Each entity may interact with other entities and may provide services to and/or receive services from the other entities.

For purposes of illustration, each entity 302-312 may be referred to as an internal entity (e.g., an engineer, customer service personnel, an automated system process, a design or fabrication facility, etc.) that forms a portion of virtual fab 300 or may be referred to as an external entity (e.g., a customer) that interacts with virtual fab 300. It is understood that entities 302-312 may be concentrated at a single location or may be distributed, and that some entities may be incorporated into other entities. In addition, each entity 302-312 may be associated with system identification information that allows access to information within the system to be controlled based upon authority levels associated with each entity's identification information.

Virtual fab 300 enables interaction among entities 302-N for the purpose of IC manufacturing, as well as the provision of services. In this embodiment, IC manufacturing includes receiving a customer's IC order and the associated operations needed to produce the ordered ICs and send them to the customer, such as the design, fabrication, testing, and shipping of the ICs.

One of the services provided by virtual fab 300 may enable collaboration and information access in such areas as design, engineering, and logistics. For example, in the design area, customer 304 may be given access to information and tools related to the design of their product via service system 302. The tools may enable customer 304 to perform yield enhancement analyses, view layout information, and obtain similar information. In the engineering area, engineer 306 may collaborate with other engineers using fabrication information regarding pilot yield runs, risk analysis, quality, and reliability. The logistics area may provide customer 304 with fabrication status, testing results, order handling, and shipping dates. It is understood that these areas are exemplary, and that more or less information may be made available via virtual fab 300 as desired.

Another service provided by virtual fab 300 may be to integrate systems between facilities, such as between design/lab facility 308 and fab facility 310. Such integration enables facilities to coordinate their activities. For example, integrating design/lab facility 308 and fab facility 310 may enable design information to be incorporated more efficiently into the fabrication process, and may enable data from the fabrication process to be returned to design/lab facility 310 for evaluation and incorporation into later versions of an IC. The process 312 may represent any process operating within the virtual fab 300.

Figure 4:
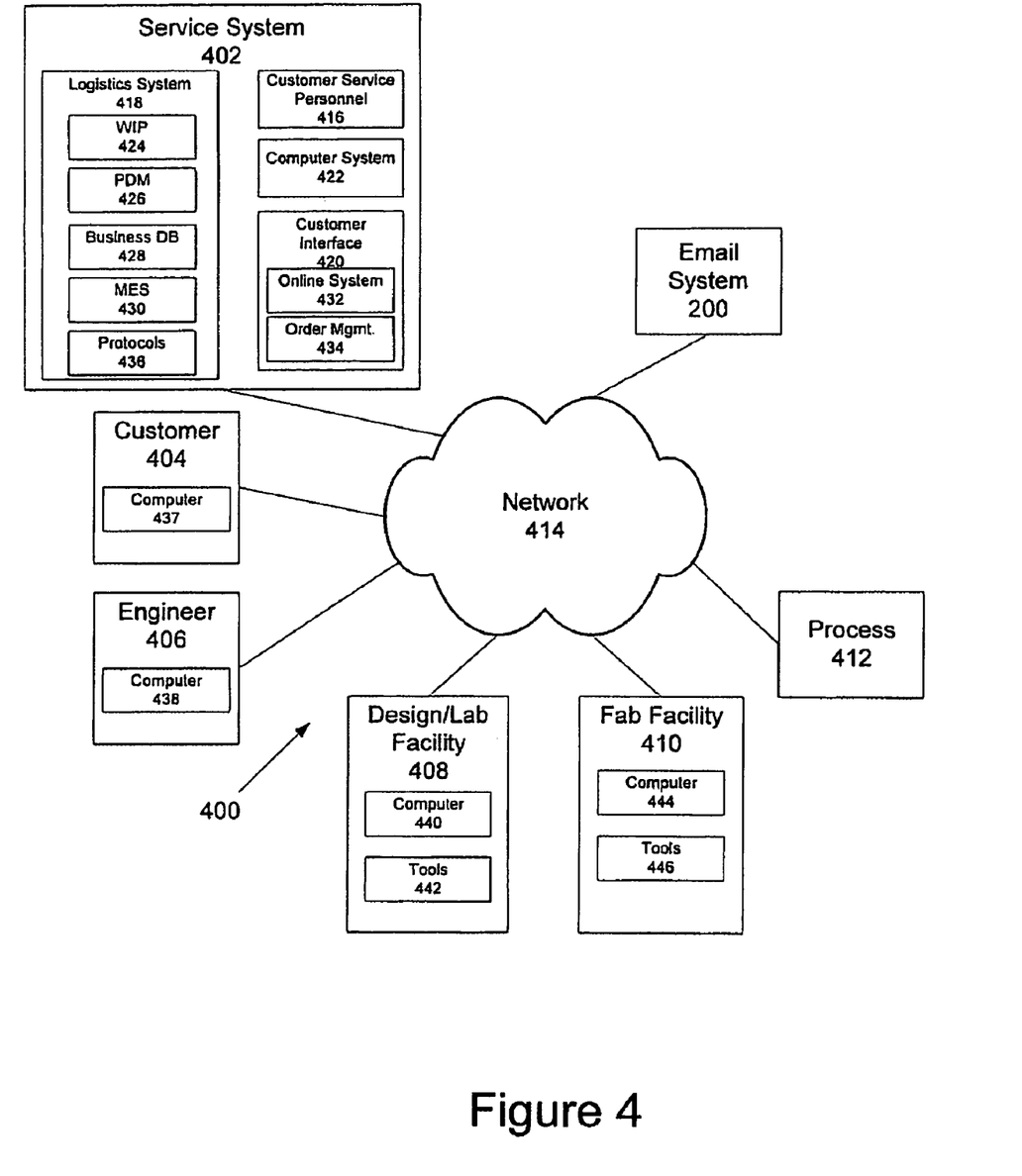
FIG. 4 is a block diagram of another embodiment of a virtual fabrication system.

Referring now to FIG. 4, another embodiment of a virtual fab 400 is illustrated. The virtual fab 400 may be similar to, and share components from, virtual fab 300 (FIG. 3), or may be a totally separate embodiment. Virtual fab 400 includes plurality of entities 200, 402, 404, 406, 408, 410, and 412 that are connected by communications network 414. In this embodiment, entity 402 represents a service system, entity 404 represents a customer, entity 406 represents an engineer, entity 408 represents a design/lab facility for IC design and testing, entity 410 represents a fab facility, and entity 412 represents a process (e.g., an automated fabrication process).

Each entity may interact with other entities and may provide services to and/or receive services from the other entities.

Service system 402 provides an interface between the customer and the IC manufacturing operations which include IC fabrication, process control, equipment maintenance, production control, quality and reliability, testing and shipping, customer order system, business management, and financial information. For example, service system 402 may include customer service personnel 416, logistics system 418 for order handling and tracking, and customer interface 420 for enabling a customer to directly access various aspects of an order.

Logistics system 418 may include work-in-process (WIP) inventory system 424, product data management (PDM) system 426, business database 428, manufacturing execution system (MES) 430, and network protocols and standards 436. WIP inventory system 424 may track working lots using a database (not shown). Product data management system 426 may manage product data and maintain a product database (not shown). The product database could include product categories (e.g., part, part numbers, and associated information), as well as a set of process stages that are associated with each category of products. Business database 428 may include marketing information, customer information, financial information, and various types of analysis, reports, and summaries. Any information in database 428 could be in different formats, intended for different purposes, such as for internal users such as the management team or marketing team, or outside users such as customers and shareholders.

MES 430 may be an integrated computer system representing the methods and tools used to accomplish production. In this embodiment, the primary functions of MES 430 may include collecting data in real time, organizing and storing the data in a centralized database, work order management, workstation management, process management, inventory tracking, and document control. MES 430 may be connected to other systems both within service system 402 and outside of service system 302. Examples of MES 430 include Promis, Workstream, Poseidon, and Mirl-MES. Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications. MES 430 may include such information as a process step sequence for each product.

Network protocols and standards 436 may include standard Internet and message exchange protocols, such as HTTP, simple object access protocol (SOAP) and extensible markup language (XML)-based request and response messages. XML is a simple and flexible text format. In addition, RosettaNet may be incorporated into the service system as an alternative business-to-business platform.

RosettaNet is a consortium of the world's leading companies working to create, implement and promote open e-business process standards. These standards form a common e-business language, aligning processes between trading partners on a global basis. RosettaNet develops open e-business standards, encompassing data dictionaries, implementation framework, and business message schemas and process specifications, proven by production implementations.

The RosettaNet interfaces are defined as a series of steps, referred as PIPs (partner interface process), which occur in the business processes between the companies. Using RosettaNet standards, manufacturing work-in-process information can be transferred directly into a customer's system because both parties subscribe to the same definitions of the business processes and their systems could communicate to each other.

PIP defines business processes between trading partners. PIPs fit into seven clusters, or groups of core business processes, that represent the backbone of the trading network. Each cluster is broken down into segments which are cross-enterprise processes involving more than one type of trading partner. Within each segment are individual PIPs.

Customer interface 420 may include online system 432 and order management system 434. Online system 432 may function as an interface to communicate with customer 404, other systems within service system 402, supporting databases (not shown), and other entities 200 and 406-412.

Online system 432 could be a quick link personal browser and book-marking tool. It supports Internet conferencing for customer engineering and other communications. It provides services that saves time and increases efficiency by combining manufacturing, mask, assembly and testing service requests in one place. It provides a search-engine in manufacturing technical documentation database.

Order management system 434 may manage client orders and may be associated with a supporting database (not shown) to maintain client information and associated order information.

Portions of service system 402, such as customer interface 420, may be associated with computer system 422 or may have their own computer systems. In one embodiment, computer system 422 may include multiple computers, some of which may operate as servers to provide services to customer 404 or other entities. Service system 402 may also provide such services as identification validation and access control, both to prevent unauthorized users from accessing data and to ensure that an authorized customer can access only their own data.

Customer 404 may obtain information about the manufacturing of its ICs via virtual fab 400 using computer system 437. In this embodiment, customer 404 may access various entities 402, 406-412 of virtual fab 400 through customer interface 420 provided by service system 402. In another embodiment, it may be desirable to enable customer 404 to access other entities without going through customer interface 420, for example, customer 404 may directly access fab facility 410 to obtain fabrication related data, with appropriate permissions.

Engineer 406 may collaborate in the IC manufacturing process with other entities of virtual fab 400 using computer system 438. Virtual fab 400 enables engineer 406 to collaborate with other engineers and design/lab facility 408 in IC design and testing, to monitor fabrication processes at fab facility 410, and to obtain information regarding test runs, yields, etc. In one embodiment, engineer 406 may communicate directly with customer 404 via virtual fab 400 to address design issues and other concerns.

Design/lab facility 408 provides IC design and testing services that may be accessed by other entities via virtual fab 400. Design/lab facility 408 may include computer system 440 and various IC design and testing tools 442. IC design and testing tools 442 may include both software and hardware.

Fab facility 410 enables the fabrication of ICs. Control of various aspects of the fabrication process, as well as data collected during the fabrication process, may be accessed via virtual fab 400. Fab facility 410 may include computer system 444 and various fabrication hardware and software tools and equipment 446. For example, fab facility 410 may include an ion implantation tool, a chemical vapor deposition tool, a thermal oxidation tool, a sputtering tool, and various optical imaging systems, as well as the software needed to control these components.

Process 412 may represent any process or operation that occurs within virtual fab 400. For example, process 412 may be an order process that receives an IC order from customer 404 via service system 402, a fabrication process that runs within fab facility 410, a design process executed by engineer 406 using design/lab facility 408, or a communications protocol that facilities communications between various entities 402-412.

It is understood that entities 200, and 402-412 of virtual fab 400, as well as their described interconnections, are for purposes of illustration only. For example, it is envisioned that more or fewer entities, both internal and external, may exist within virtual fab 400, and that some entities may be incorporated into other entities or distributed. For example, service system 402 may be distributed among various entities 406-410.

Figure 5:
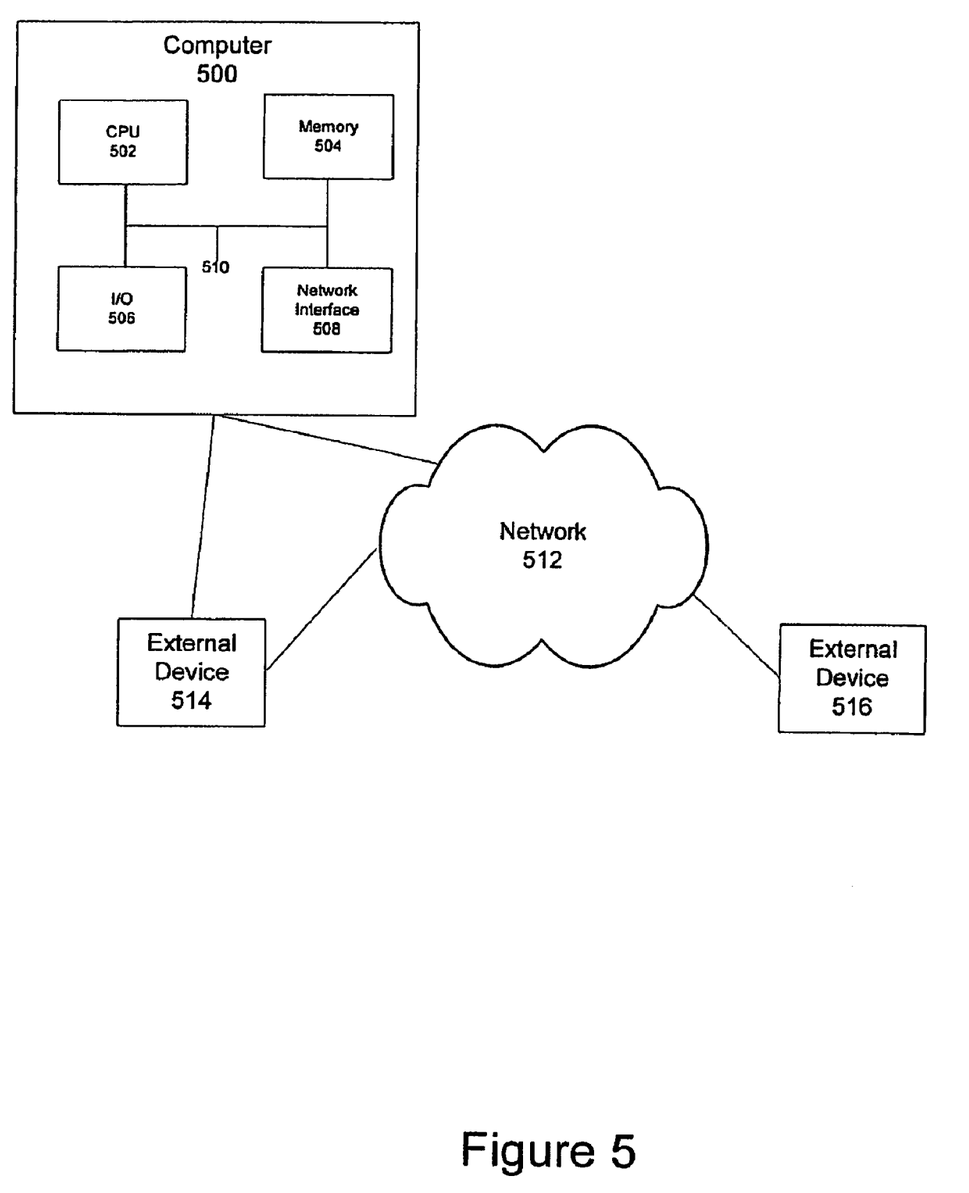
FIG. 5 is a block diagram of a computer.

Referring now to FIG. 5, computer 500, such as may be used within virtual fab 300 of FIG. 3 or virtual fab 400 of FIG. 4, or may house one or more portions of email system 200, is illustrated. Computer 500 may include central processing unit (CPU) 502, memory unit 504, input/output (I/O) device 506, and network interface 508. Network interface 508 may be, for example, one or more network interface cards (NICs). Components 502, 504, 506, and 508 are interconnected by bus system 510. It is understood that the computer may be differently configured and that each of the listed components may actually represent several different components. For example, CPU 502 may actually represent a multi-processor or a distributed processing system; memory unit 504 may include different levels of cache memory, main memory, hard disks, and remote storage locations; and I/O device 506 may include monitors, keyboards, printer, and the like.

Computer 500 may be connected to network 512, which may be connected to networks 210 (FIG. 2), 316 (FIG. 3) and/or 416 (FIG. 4). Network 512 may be, for example, a complete network or a subnet of a local area network, a company wide intranet, and/or the Internet. Computer 500 may be identified on the network 512 by an address or a combination of addresses, such as a media control access (MAC) address associated with network interface 508 and an internet protocol (IP) address. Because computer 500 may be connected to network 512, certain components may, at times, be shared with other devices 514, 516. Therefore, a wide range of flexibility is anticipated in the configuration of computer 500. Furthermore, it is understood that, in some implementations, computer 500 may act as a server to other devices 514, 516. Devices 514, 516 may be computers, personal data assistants (PDA), wired or cellular telephones, or any other device able to communicate with computer 500.

Figure 6:
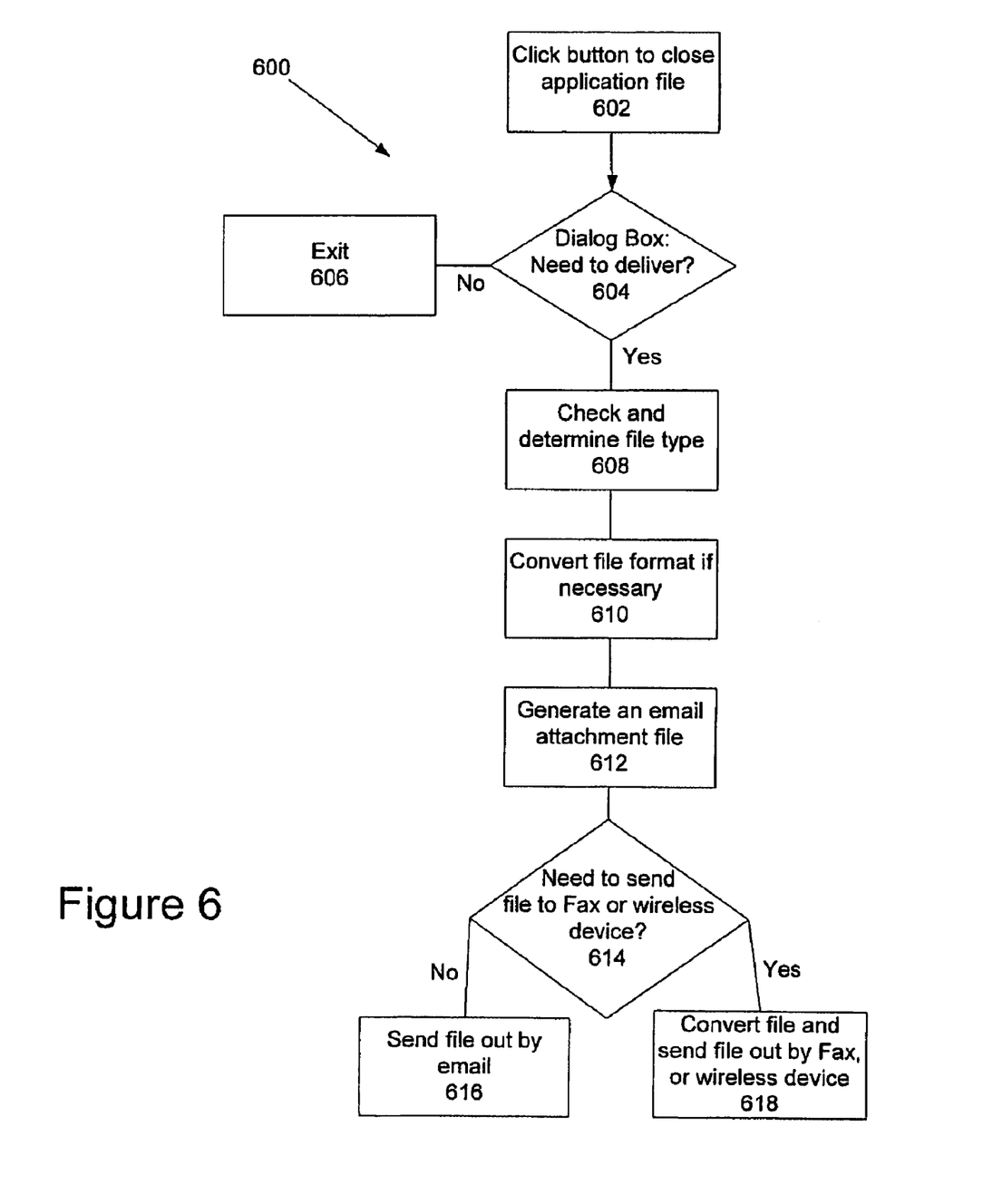
FIG. 6 is a flowchart of a method of another embodiment of the present disclosure.

Referring now to FIG. 6, in another embodiment, method 600 that may be implemented with email system 200 of FIG. 2, virtual fab 300 of FIG. 3 and/or virtual fab 400 of FIG. 4, is illustrated.

Method 600 begins at 602, in which a user clicks a button to close a file after the user completed work on the file, for example processing data to create a report.

At 604, a dialog box will pop open with options for the user to choose either to deliver the information to recipients or not to deliver the information. The user provides a response by clicking the proper button. If not delivered, then the user exits from the processing at 606. Otherwise, if information will be delivered, method 600 will move to 608.

At 608, the integrated file server will check and find out the file type of the currently closed file, for example a report. At 610, depending on the file type, the integrated file server may convert the file to the proper type for later processing, such as attaching to an email or sending out as a voice message or Fax file.

At 612, the integrated file server will automatically generate an email attachment file which could be an email saved in an email outbox and ready to be forwarded to intended recipients, or an opened email which has the converted file attached and is waiting for the user to input email distribution list, or a stand alone file which could be attached to an email later.

At 614, the integrated file server may ask if the file needs to be sent to a Fax machine or wireless device. This could be combined with step 604, or follow right after.

At 616, if the user chooses to send the file only by email, the attached file will be sent out by email system.

At 618, if the user chooses to send the file through Fax, or wireless media, the integrated file server may generate a voice mail for wireless device, or a picture file for Fax machine, or another file format which is compatible with a Fax or wireless device. 616 and 618 could be executed in parallel according to user's needs.

In one embodiment, there is disclosed a computer-implemented method for circulating a file, the method including choosing at least one input file, choosing an output file format, choosing a mode for circulation, extracting file information to the output file, and circulating the output file to at least one recipient. In another embodiment, the at least one input file comprises a product manufacturing report from a semiconductor foundry. In another embodiment, the method also includes converting the at least one input file to a different file format. In another embodiment, the mode for circulation comprises e-mail. In another embodiment, the mode for circulation comprises facsimile. In another embodiment, the mode for circulation comprises a wireless device. In another embodiment, the at least one input file comprises at least two input files. In another embodiment, the mode for circulation comprises sending an e-mail to at least two different users, the at least two different users having different e-mail systems. In another embodiment, the mode for circulation comprises sending an e-mail to at least one user, and sending a facsimile to at least one other user, the at least one other user at a different location than the at least one user.

In one embodiment, there is disclosed a computer-implemented method for circulating a file, the method including a user closing an application file, a computer querying the user if the application file is to be circulated, if the application file is to be circulated, the computer checking and determining the application file type, preparing the application file for circulation, and circulating the output file to at least one recipient. In another embodiment, the application file comprises a product manufacturing report from a semiconductor foundry. In another embodiment, preparing the application file comprises converting the application file to a different file format. In another embodiment, a mode for circulation comprises e-mail. In another embodiment, a mode for circulation comprises facsimile. In another embodiment, a mode for circulation comprises a wireless device. In another embodiment, the application file comprises at least two separate application files. In another embodiment, circulating comprises sending an e-mail to at least two different users, the at least two different users having different e-mail systems. In another embodiment, circulating comprises sending an e-mail to at least one user, and sending a facsimile to at least one other user, the at least one other user at a different location than the at least one user.

In one embodiment, there is disclosed a system for circulating a file, the system including a virtual fabrication system comprising a plurality of components located at at least two different locations, the components connected by a network, a memory system connected to the network configured to store files regarding the operation of the virtual fabrication system, a communication system connected to the network, and configured to circulate one or more of the files to a plurality of recipients. In another embodiment, at least one of the files comprises a product manufacturing report from a semiconductor foundry. In another embodiment, the communication system is adapted to convert the files to a different file format. In another embodiment, the communication system is adapted to send emails. In another embodiment, the communication system is adapted to send facsimiles. In another embodiment, the communication system is adapted to send the files to a wireless device. In another embodiment, the communication system is adapted to send emails and facsimiles. In another embodiment, the communication system is adapted to send emails, facsimiles, and files to a wireless device.

The present disclosure has been described relative to multiple embodiments. Improvements or modifications that become apparent to persons of ordinary skill in the art only after reading this disclosure are deemed within the spirit and scope of the application. The present disclosure may be applied and implemented for a variety of applications. It is understood that several modifications, changes and substitutions are intended to be within the scope of the foregoing disclosure, and in some instances some features of the disclosure will be employed without a corresponding use of other features. Accordingly, it is appropriate that the appended claims be construed broadly and not in a manner limited to the scope of the disclosure.

What is claimed is:

1. In a semiconductor manufacturing environment with a plurality of separate entities, a computer-implemented method for circulating a file between the entities comprising:
   selecting at least one of a plurality of input files;
   selecting an output file format from a plurality of output file formats;
   selecting a mode for circulation from a plurality of modes for circulation;
   extracting by a computer file information from the selected at least one input file to an output file in the selected output file format; and
   circulating by the computer the output file to at least one recipient entity using the selected mode for circulation.

2. The computer-implemented method of claim 1, wherein the at least one input file comprises a product manufacturing report from a semiconductor foundry.

3. The computer-implemented method of claim 1, further comprising converting by the computer the at least one input file to a different file format prior to the extracting.

4. The computer-implemented method of claim 1, wherein the mode for circulation comprises e-mail.

5. The computer-implemented method of claim 1, wherein the mode for circulation comprises facsimile.

6. The computer-implemented method of claim 1, wherein the mode for circulation comprises a wireless device.

7. The computer-implemented method of claim 1, wherein the at least one input file comprises at least two input files.

8. The computer-implemented method of claim 1, wherein the mode for circulation comprises sending an e-mail to at least two different entities, the at least two different entities having different e-mail systems.

9. The computer-implemented method of claim 1, wherein the mode for circulation comprises sending an e-mail to at least one entity, and sending a facsimile to at least one other entity, the at least one other entity being at a different location than the at least one entity.

10. A computer-implemented method for circulating a file associated with the manufacture or sale of semiconductor devices, the method comprising:
    closing by a computer an application file responsive to a user request;
    querying the user by the computer if the application file is to be circulated;
    if the application file is to be circulated, checking and determining by the computer the application file type;
    preparing by the computer the application file for circulation, wherein the preparing comprises converting the application file to another application file type if necessary; and
    circulating by the computer the output file to at least one recipient using a selected one of a plurality of circulation modes.

11. The computer-implemented method of claim 10, wherein the application file comprises a product manufacturing report from a semiconductor foundry.

12. The computer-implemented method of claim 10, wherein preparing the application file comprises converting the application file to a different file format.

13. The computer-implemented method of claim 10, wherein a mode for circulating comprises e-mail.

14. The computer-implemented method of claim 10, wherein a mode for circulating comprises facsimile.

15. The computer-implemented method of claim 10, wherein a mode for circulating comprises a wireless device.

16. The computer-implemented method of claim 10, wherein the application file comprises at least two separate application files.

17. The computer-implemented method of claim 10, wherein circulating comprises sending an e-mail to at least two different users, the at least two different users having different e-mail systems.

18. The computer-implemented method of claim 10, wherein circulating comprises sending an e-mail to at least one user, and sending a facsimile to at least one other user, the at least one other user at a different location than the at least one user.

19. A system for circulating a file, the system comprising:
    a virtual fabrication system comprising a plurality of components located in at least two different locations, the components connected by a network;
    a memory system connected to the network configured to store files regarding the operation of the virtual fabrication system;
    a communication system connected to the network, and configured to extract data from at least one input file to an output file having a format selected from one of a plurality of file formats and circulate the output file to a plurality of recipients using a selected one of a plurlaity of modes for circulation.

20. The system of claim 19, wherein the at least one input file comprises a product manufacturing report from a semiconductor foundry.

21. The system of claim 19, wherein the communication system is adapted to convert the at least one input file to a different file format.

22. The system of claim 19, wherein the communication system is adapted to send emails.

23. The system of claim 19, wherein the communication system is adapted to send facsimiles.

24. The system of claim 19, wherein the communication system is adapted to send the files to a wireless device.

25. The system of claim 19, wherein the communication system is adapted to send emails and facsimiles.

26. The system of claim 19, wherein the communication system is adapted to send emails, facsimiles, and files to a wireless device.

* * * * *